Figure 1:
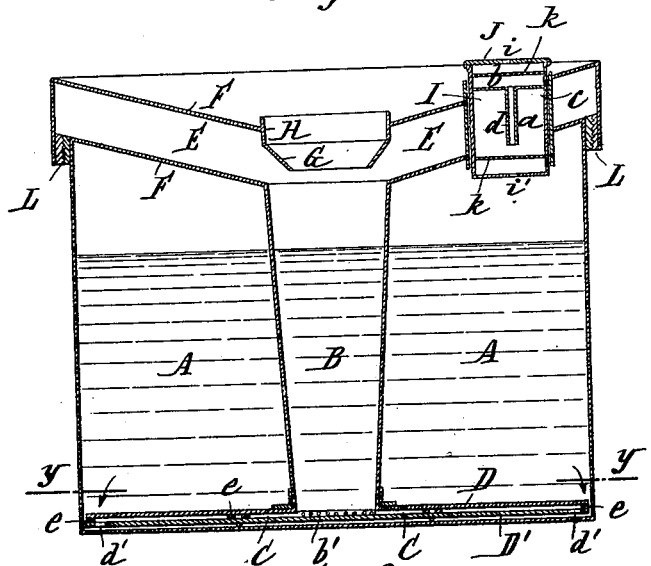
Figure 2:
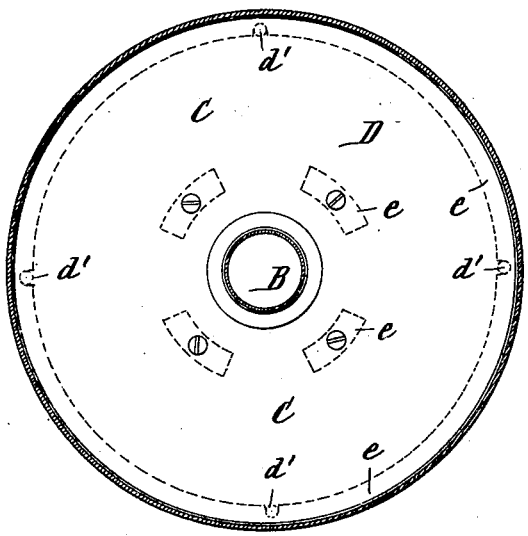

No. 676,674.  Patented June 18, 1901.
J. R. BOUHON.
OIL RESERVOIR OR CONTAINER FOR HEATING AND LIGHTING APPARATUS.
(Application filed Feb. 9, 1899.)

(No Model.) 5 Sheets—Sheet 1.

Witnesses:

Inventor:
Julius R. Bouhon
By Wm. E. Boulter,
Attorney

THE NORRIS PETERS CO., PHOTO-LITHO., WASHINGTON, D. C.

No. 676,674. Patented June 18, 1901.
J. R. BOUHON.
OIL RESERVOIR OR CONTAINER FOR HEATING AND LIGHTING APPARATUS.
(Application filed Feb. 9, 1899.)
(No Model.) 5 Sheets—Sheet 2.

Witnesses:

Inventor:
Julius R. Bouhon,
Wm E. Boulter,
Attorney

No. 676,674. Patented June 18, 1901.
J. R. BOUHON.
OIL RESERVOIR OR CONTAINER FOR HEATING AND LIGHTING APPARATUS.
(Application filed Feb. 9, 1899.)
(No Model.) 5 Sheets—Sheet 3.

No. 676,674. Patented June 18, 1901.
J. R. BOUHON.
OIL RESERVOIR OR CONTAINER FOR HEATING AND LIGHTING APPARATUS.
(Application filed Feb. 9, 1899.)
(No Model.) 5 Sheets—Sheet 4.

Witnesses. Inventor

No. 676,674. Patented June 18, 1901.
J. R. BOUHON.
OIL RESERVOIR OR CONTAINER FOR HEATING AND LIGHTING APPARATUS.
(Application filed Feb. 9, 1899.)
(No Model.) 5 Sheets—Sheet 5.

United States Patent Office.

JULIEN RAYMOND BOUHON, OF ANTWERP, BELGIUM, ASSIGNOR TO SOCIETE ANONYME POUR L'ECLAIRAGE ET LE CHAUFFAGE PAR LE PETROLE, (BREVET BOUHON,) OF SAME PLACE.

OIL RESERVOIR OR CONTAINER FOR HEATING AND LIGHTING APPARATUS.

SPECIFICATION forming part of Letters Patent No. 676,674, dated June 18, 1901.

Application filed February 9, 1899. Serial No. 705,100. (No model.)

*To all whom it may concern:*

Be it known that I, JULIEN RAYMOND BOUHON, a subject of the King of Belgium, residing at Antwerp, Belgium, have invented certain new and useful Improvements in Oil Reservoirs or Containers for Heating and Lighting Apparatus, (for which applications for patent in Belgium were made on the 16th of August, 1898, and on the 13th of December, 1898, and in Great Britain, under No. 27,013, dated December 21, 1898,) of which the following is a specification.

Explosions frequently take place in oil-reservoirs of lamps, stoves, and the like, when the reservoir is overturned, owing to the liquid's arriving at the flame or to the latter's penetrating into the reservoir, the flame coming in contact with the surface of the free liquid and instantaneously producing a mixture of explosive gases, which ignites. An explosion may also take place owing to the presence of such explosive mixture (petroleum-gas and atmospheric air) in the interior of the reservoir, gases having been formed by an excessive heating of the walls of the reservoir, so that an accidental contact between the flame and the mixture may take place not only when the reservoir is upset, but also during the ordinary working of the lighting or heating apparatus.

The present invention relates to improvements in oil reservoirs or containers for lighting and heating apparatus; and among the objects in view is to provide a simple and inexpensive reservoir wherein the dangers of explosion attending the use thereof are reduced to a minimum.

The invention chiefly consists, first, in establishing, by means of a capillary chamber constituted by a space between the closely-adjoining surface of two (preferably detachable) disks or plates arranged at the bottom of the reservoir, such a communication between the feeding or supply compartment and the wick-containing compartment of the reservoir that the liquid is supplied slowly by percolation to the latter compartment and that whatever be the quantity of liquid in the reservoir and whatever be the position of the latter this capillary chamber always contains a layer of liquid completely closing it and preventing, in coöperation with the walls of the disks, an open communication between the two compartments, so that a flame which might accidentally enter the wick-compartment cannot enter the main reservoir; secondly, in arranging above the two compartments a chamber communicating with the wick-compartment, so that in any horizontal or reversed position of the reservoir the total quantity of liquid of this compartment may escape into the supplementary chamber, the walls of which are inclined toward the interior of the receptacle, so as to prevent the liquid from reaching the burner under the action of any shocks to which a reservoir is submitted when it falls or is upset, said supplementary chamber constituting, besides, an insulating-chamber for separating the oil-reservoirs from the burner and preventing heating of their walls; thirdly, in arranging the filling-conduit directly on the reservoir or supply-compartment, so that it is impossible to completely fill the two compartments, the feeding or supply compartment filling rapidly, whereas the filling of the wick-compartment takes place slowly, owing to the narrowness of the communication passage or chamber, and, fourthly, in closing said filling conduit or orifice by a plug formed so as to admit air into the reservoir during the working of the apparatus.

The accompanying drawings illustrate several examples of reservoirs according to this invention.

Figure 9:
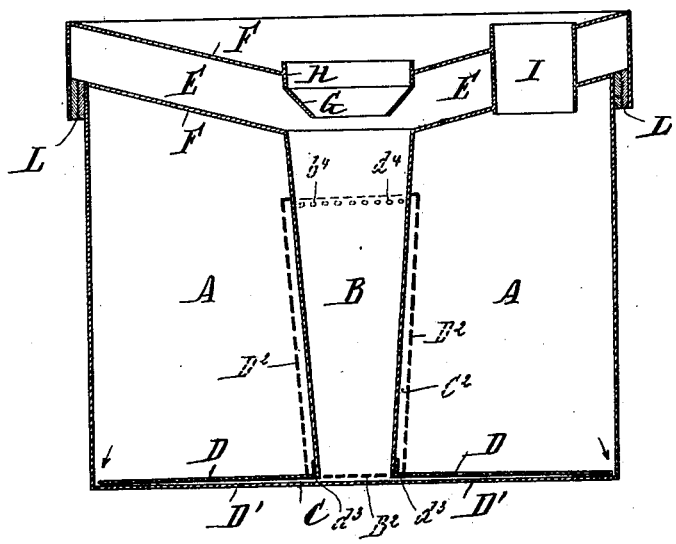
Figure 10:
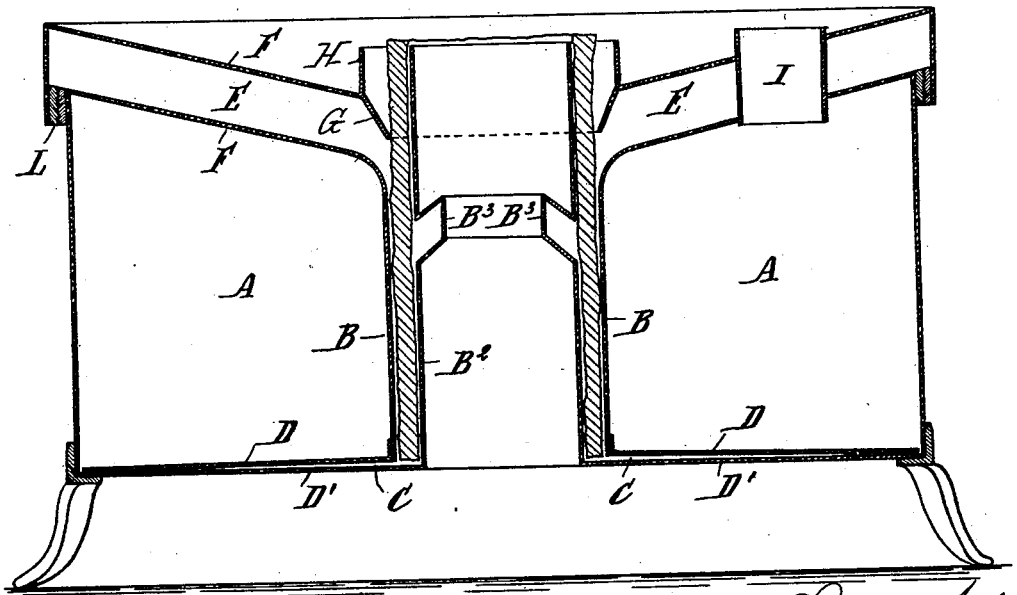

In the drawings, Figures 1, 3, 5, 7, and 9 are vertical sections of different forms of reservoirs, and Figs. 2, 4, 6, and 8 are corresponding horizontal cross-sections on the lines *y y* of Figs 1, 3, 5, and 7, respectively, Fig. 10 being a vertical section of a reservoir of a stove with a central air-conduit.

Figure 3:
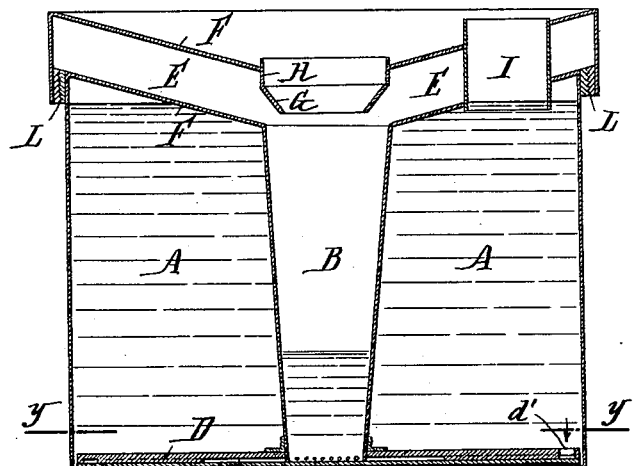
Figure 4:
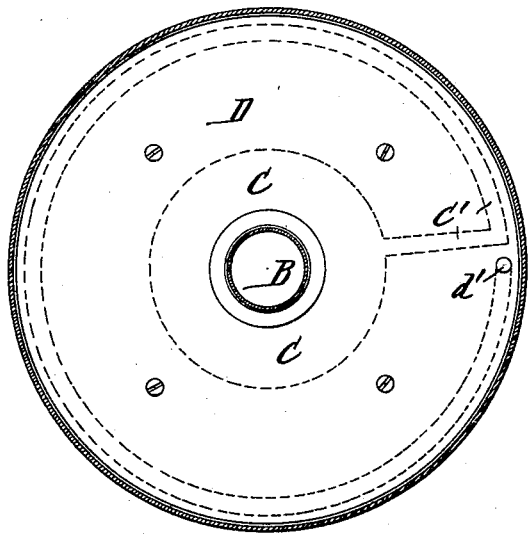
Figure 5:
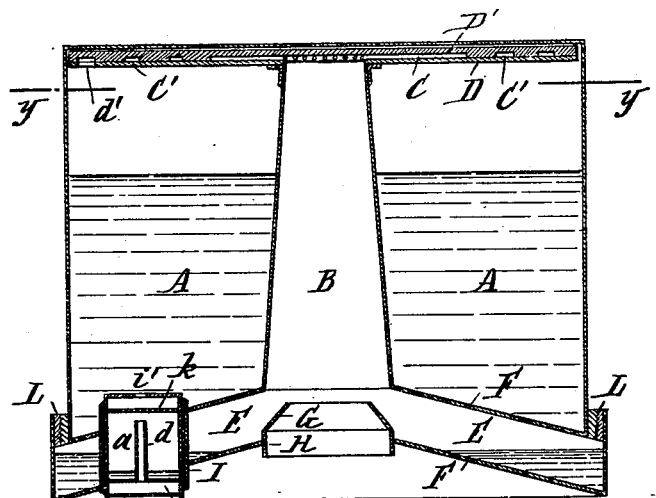
Figure 6:
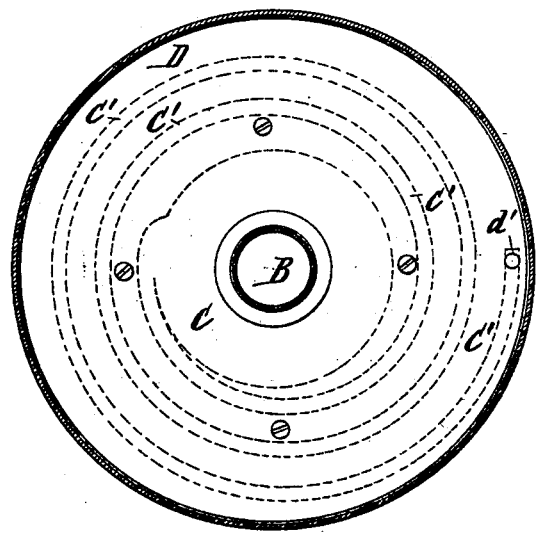
Figure 1:
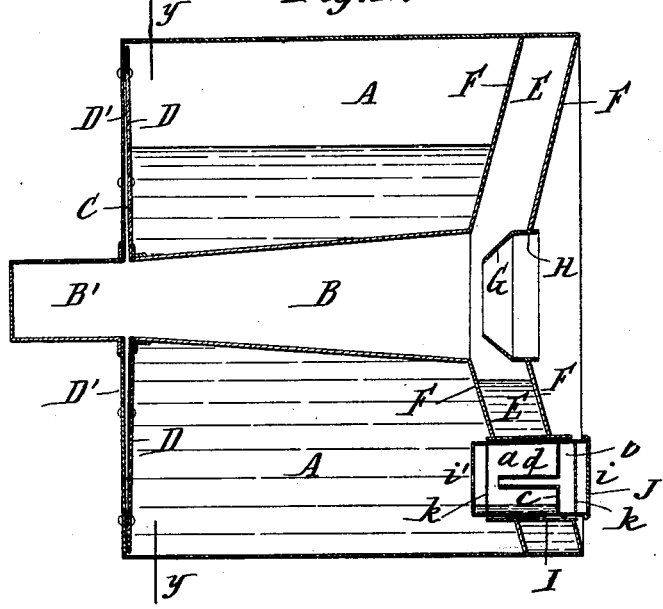
Figure 8:
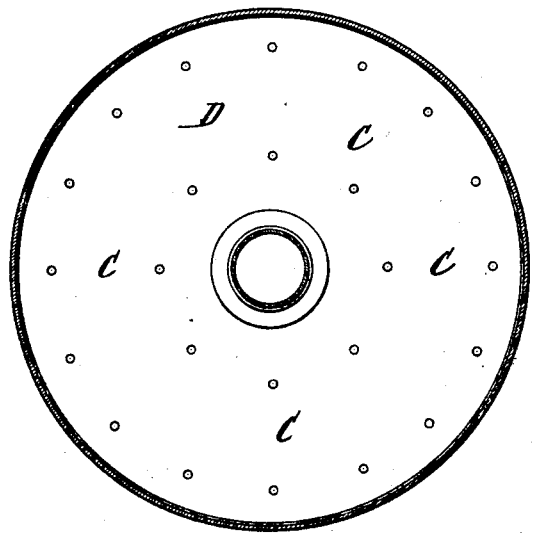

Each reservoir comprises the supply-compartment A or the reservoir proper and a conical or cylindrical wick-compartment B. These compartments are connected together by a space or capillary chamber C, formed between two disks or plates D D', arranged very close together. In the drawings this space is shown much wider for the sake of clearness than is actually the case in practice. These disks are preferably of almost the same diameter as the reservoir A and are preferably arranged as close as possible to the bottom of said reservoir and so as to be separable. (See Figs. 1, 3, 5, 9, and 10.) The lower disk D' forms the bottom of the wick-reservoir formed by the vertical tube B, which is preferably provided with perforations $b'$, through which it communicates with the capillary space C, the upper disk D being soldered to the cone or vertical tube B. One of the plates D D', Figs. 1, 3, and 5, is provided with one or several holes $d'$, establishing communication between the chamber C and the reservoir A. The desired distance apart of the disks D and D' is insured by means of thin distance-pieces $e\ e$, inserted between them, Figs. 1 and 2, or by means of projections on one of the disks shown in Figs. 3 to 6. In the example illustrated in Figs. 1 and 2 the admission-holes $d'$ are made in the lower disk D', and the points of set-screws maintain the disk at a little distance from the bottom of the reservoir A. In the example shown in Figs. 3 to 6 the upper disk D is provided with an admission-hole $d'$, the lower disk D' resting on the bottom of the reservoir. Finally, in the examples shown in Figs. 8, 9, and 10 the admission of the liquid into the capillary chamber takes place at the side between the disks, neither of which has any perforations. In this case the lower disk D' preferably constitutes at the same time the bottom of the reservoir A. The capillary chamber C, Figs. 1, 2, 7, 8, and 9, may extend uniformly throughout the whole width or area of the disks, which is the simplest and most practical construction, or it may be partially formed by a more or less long passage C', formed by a shallow groove on one of the disks D D', as shown in Figs. 4 and 6.

In certain cases the horizontal capillary chamber C, formed between the two disks D D', may terminate in a vertical capillary chamber surrounding the wick-chamber B, merging into the upper portion of the latter. In this case the wick-chamber B is completely closed at the bottom by a bottom $B^2$ and surrounded by a jacket $D^2$, forming with the wall B a capillary space $C^2$, closed, as regards reservoir A, at the top and communicating on the one hand through small openings $d^4$ with the chamber B and on the other hand through an annular opening $d^3$ with the horizontal capillary chamber C. Owing to capillarity the liquid rises into the chamber $C^2$ whatever be the level of the liquid. The wick arranged in the chamber B and in contact with the openings $d^4$ absorbs the liquid through said openings, the chamber B remaining substantially dry. When the disks D D' are separable, any suitable capillary body may be arranged between the disks.

The wick-receptacle B communicates at the top with a supplementary reservoir E, extending over the reservoir A and occupying all the width of the latter. The capacity of said reservoir E should be equal to at least double the capacity of the reservoir B in order that in all the positions of the reservoir, whether reversed or horizontal, Figs. 5 and 7, the total quantity of the liquid contained in B should be able to escape into a part of the compartment E. The walls F F are inclined toward the interior of the reservoir, and the nut or socket H for the burner is provided with an extension G, having the shape of an inverted truncated cone for causing the liquid to flow away from the burner and for preventing it from reaching the burner under the influence of shocks caused by the fall of the reservoir.

The filling-tube I passes through the walls F F of the reservoir E and leads directly to the interior of the compartment A, since it is essential to have the reservoir fully charged in the supply-compartment and not in the wick-receptacle. The tube I is closed by a hollow plug J, provided with two small holes $i\ i'$ at opposite ends, and divided by a partition $c$ into two compartments $a\ b$ of different size. A tube $d$ of narrow cross-section establishes communication between these two compartments. In each compartment $a$ and $b$ is a metal net or sieve K to prevent the passage into the reservoir A of any flame that might pass through the small hole $i$.

The reservoir is preferably arranged so as to be easily detachable in order to enable the space between the disks, which are also preferably detachable, to be cleaned. For this purpose, as shown in Figs. 1, 3, and 5, the reservoirs E B, with the socket H G and the tube I, as well as the disks D D', and, if used or necessary, the jacket $D^2$, are connected when possible into an independent whole provided with a screw-thread L, adapted to be screwed onto an external screw-thread of the reservoir. In this construction the lower wall or partition F should not be integral with the reservoir A, but be separable therefrom.

In Figs. 9 and 10 I form the capillary chamber C by moving the disk D toward the bottom D' of the reservoir by screwing down the part E B on the reservoir A. In certain cases, however, where the purity of the liquid fuel is beyond doubt reservoirs such as that shown in Fig. 7 may be used, in which the partitions F F are soldered to the receptacle A and the disk D is connected to the bottom D' by means of rivets, the outer edges being, preferably, nearer the bottom than the inner portion near the wick-tube B. The inclination of the walls F results in decreasing the height of the wick-compartment B. In case it is desired to regain this loss of height in order to enable longer wicks to be used the compartment B may be extended beyond the bottom, as shown at B', Fig. 7, in which case the capacity of the chamber E must be correspondingly increased.

Fig. 10 shows a reservoir for stoves or lamps with a central air-conduit. This reservoir differs from those just described only by an absence of taper of the compartment B, which here forms, together with the central conduit B², a reservoir or tube inclosing the wick. The lower disk D' constitutes the bottom of the reservoir and extends as far as the central tube B², the upper disk D being soldered to the tube B. In the central conduit B² is formed an annular pocket B³, inclined upward, so should the lighted stove be dropped or overturned the oil between the wick and the central tube B² will enter said pocket B³ and will reach the burner H. The reservoir is filled through the conduit I. As the liquid passes only very slowly from the receptacle A into the compartment B, the latter is far from being filled when the receptacle A is full and begins to overflow, Fig. 3. Consequently it is impossible ordinarily to fill completely the two compartments A and B of the reservoir, which impossibility is essential for the purpose of insuring such a working of the apparatus as to guarantee it against the danger of explosions. Having filled the reservoir A, the conduit I is closed by the plug J, which admits air through the holes $i$ and $i'$ as the liquid escapes from A to B, where in consequence of the principle of communicating vessels it reaches the same level as the liquid in the outer compartment A, Fig. 1. In order to pass from the supply-chamber A into the wick-compartment B, the oil has to pass through the narrow capillary space C between the disks D D'. This extremely slow flow is in reality simply a uniform percolation taking place as the oil burns. The liquid taken from the portion the farthest removed from the burner is thus cooled by a large metal surface (the two disks D D') before reaching the wick. Owing to the small space between the disks and between the latter and the bottom there is produced a purifying action on the liquid, like a filter. This purification is a very thorough one when the liquid is forced to pass under the lower disk, Fig. 1, in order to reach the admission-hole of the capillary chamber C or has to pass between the disks, Figs. 7, 9, and 10. The chamber E insulates the reservoir A from the burner and keeps it comparatively cool. Owing to these different circumstances (pure and cool liquid, absence of gas, &c.) the flame produced by the liquid supplied to the burner is particularly clear and steady and has no smell or smoke. The admission of air into the reservoir A as the oil burns is necessary in order to prevent formation of a vacuum in the reservoir A, as the joint between the walls surrounding the burner must be perfectly air-tight in a safety-reservoir. Besides, a capillary conduit, such as C, will not let any liquid through unless atmospheric pressure is added to that of the liquid column.

If the reservoir be accidentally upset, Fig. 5, the liquid from the wick-tube B passes into the chamber E, passing away from the burner, and fills an annular space in this chamber. The inclination of the walls F F toward the interior and the conical guard G prevent the liquid from reaching the burner under the action of shocks caused by a fall, &c. The lower portion of the reservoir A becomes emptied, (the liquid filling the upper portion,) whereas the capillary chamber C remains completely filled, with a layer of liquid remaining imprisoned between the two disks D D'. If the flame should in any way pass into the compartment B, it could not pass through the narrow space C, filled with the liquid. When the reservoir remains for a long time in a reversed position, the chamber $a$ of the plug J may also become partially filled with liquid through the hole $i'$. The liquid in order to escape from the plug would have to reach the level of the tube $d$ and to overflow through it. In practice the cross-sectional area of the holes $i\,i'$ is so small that this need not be feared. The metal netting K safeguards the plug against passage of the flame.

When the reservoir is half turned over—i. e., into a horizontal position, Fig. 7—the liquid from the wick-tube B passes into the lower portion of the chamber E, and the liquid in the compartment A leaves one part of the receptacle, whereas the capillary chamber C remains completely filled with the liquid. The compartment $a$ of the plug may possibly receive a few drops of oil. The capillary chamber C therefore remains in all positions of the reservoir filled with liquid, even when the receptacles A and B are nearly empty.

When the chamber C is filled with impurities, it can be easily cleaned, owing to the disks D D' being separable.

The insulating-chamber E prevents any excessive heating of the reservoirs, whereby the formation of gas in the interior of the reservoirs, as well as of the percolation of liquid through the walls of the receptacle, is prevented.

I claim—

1. In an oil-reservoir, the combination with a liquid-supply compartment, and a wick-compartment, of two superposed plates forming between them a capillary space communicating with the said compartments, the said plates being separably arranged as and for the purpose set forth.

2. In an oil-reservoir, the combination with a liquid-supply compartment, and a wick-compartment, of two superposed plates forming between them a capillary space communicating with the said compartments.

3. In an oil-reservoir, the combination of superposed disks arranged close together forming between them a capillary space and the lower disk forming between it and the bottom of the reservoir a second capillary space communicating with the first through openings in the lower disk.

4. In an oil-reservoir, the combination of superposed disks arranged close together forming between them a capillary space and the lower disk forming between it and the bottom of the reservoir a second capillary space communicating with the first through openings in the lower disk, the said disks being separably arranged.

5. In an oil-reservoir, the combination with a liquid-supply compartment, and a wick-compartment, of superposed disks forming between them a capillary chamber in communication with the said compartments, a reserve chamber communicating with the wick-compartment and forming a chamber around the burner having a capacity equal to at least double that of the wick-compartment.

6. In an oil-reservoir, the combination with a liquid-supply compartment, and a wick-compartment, of superposed disks forming between them a capillary chamber in communication with the said compartments, of an annular chamber occupying the whole width of the reservoir, and forming an insulating-chamber between the burner and the two compartments.

7. In an oil-reservoir, the combination with a liquid-supply compartment, and a wick-compartment, of superposed disks forming between them a capillary chamber in communication with the said compartments, of an annular chamber occupying the whole width of the reservoir and forming an insulating-chamber between the burner and the two compartments of the reservoir the walls of the annular chamber being inclined toward the interior of the reservoir.

8. In an oil-reservoir, the combination with a liquid-supply compartment and a wick-compartment and superposed disks forming between them a capillary chamber in communication with the said compartments, of an annular chamber forming an insulating-chamber between the burner and the said two compartments and having inclined walls, the socket of the burner, and a conical guard arranged in said annular chamber under said socket.

9. In an oil-reservoir, the combination with the liquid-supply compartment, and a wick-compartment, and superposed disks forming between them a capillary chamber in communication with the said compartments, of an annular chamber forming an insulating-chamber between the burner and the said two compartments, and having walls inclined toward the interior of the reservoir, and a filling-conduit passing through said insulating-chamber and communicating directly with the supply-compartment.

10. In an oil-reservoir, the combination with the supply-compartment, and a wick-chamber, of superposed disks at one end of the wick-chamber and forming between them a capillary space, an insulating-chamber communicating with the other end of the wick-chamber, a conduit passing through the insulating-chamber, a socket for the burner and a liquid-deflecting guard secured on the socket and projecting into the insulating-chamber.

In testimony whereof I have hereunto set my hand in the presence of the two subscribing witnesses.

JULIEN RAYMOND BOUHON.

Witnesses:
M. COOSEMANS,
EDMOND VAN DE WALLE.